*Nathan Thompson. Impt in Dies or Molds.*

No. 121,736. Patented Dec. 12, 1871.

Witnesses.
Fred Haynes
R. R. Rabeau

Nathan Thompson

AM. PHOTO-LITHOGRAPHIC CO. N.Y. (OSBORNE'S PROCESS.)

UNITED STATES PATENT OFFICE.

NATHAN THOMPSON, OF BROOKLYN, NEW YORK.

IMPROVEMENT IN MOLDS FOR CASTING.

Specification forming part of Letters Patent No. 121,736, dated December 12, 1871; antedated December 1, 1871.

*To all whom it may concern:*

Be it known that I, NATHAN THOMPSON, of Brooklyn, in the county of Kings and State of New York, have invented a new and useful Improvement in Dies or Molds, of which the following is a full, clear, and exact description, reference being had to the accompanying drawing forming part of this specification, and in which—

Figure 1:
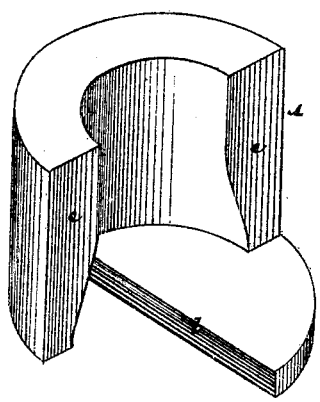
Figure 2:
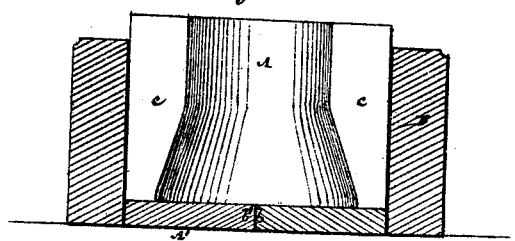
Figure 3:
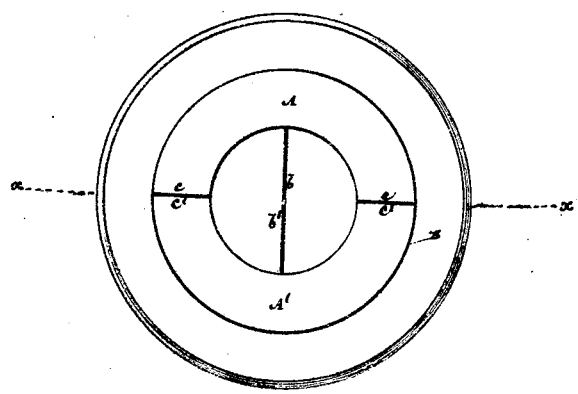

Figure 1 represents a view in perspective of the one-half or portion of a divided mold constructed in accordance with the invention; Fig. 2, a transverse section of said mold, showing the sections or halves thereof fitted together, the section being taken as indicated by the line $x\ x$ in Fig. 3, which is a face or end view of such mold.

Similar letters of reference indicate corresponding parts throughout the several figures.

My invention relates to dies or molds which are divided at their sides and bottom or one end to facilitate the removal of the molded article; and the invention consists in a female die or matrix divided in different directions or planes at its sides and bottom or one end, and whereby the halves or portions of the matrix are guided to their proper relative positions and made to support each other when closed and secured or held in place, as, for instance, by a close outer case or clamp.

The invention is more especially designed to be used in the manufacture of hollow-ware and other articles usually made of sheet metal, hard rubber, leather, and other material capable of being pressed into shape within the mold by means of a yielding substance placed within the mold and subjected to compression by a plunger to force the material to be molded into or against the sides or sides and bottom of the mold, as more fully described in a previous application, for which Letters Patent have been allowed me. The divided die or mold, however, which is the subject of this application, is not restricted to any particular process of manufacturing various articles by it, nor yet to any one general or special configuration to suit plain or ornamental work, whether of circular contour or angular form and whether of a shell-like construction or solid. It will suffice here, however, to show a matrix of circular form suitable for making knobs or handles for walking-canes, drawers, and other articles.

In the accompanying drawing, A and A' represent the halves of a mold divided at its sides and bottom, and each half or divided portion of which has its partial side and bottom formed in one piece or united together. The bottom or closed end of said divided mold has its inner edges $b\ b'$ arranged in a plane or planes lying at right angles or thereabout to the edges $c\ c'$ of the divisions in the sides of the mold, so that on fitting the halves or portions of the divided mold together they are guided to their proper relative positions by the sliding of the inner edges of the half or partial bottoms along each other, and the halves or portions of the matrix are caused to support or retain each other in position. When thus fitted together, the halves or divided portions of the matrix may be clamped or secured by any suitable means, as, for instance, by slipping a close case or box, B, over them.

What is here claimed, and desired to be secured by Letters Patent, is—

A female die or matrix, divided at its sides and bottom or one end in directions or planes at right angles to each other or thereabout, substantially as specified.

NATHAN THOMPSON.

Witnesses:
 FRED. HAYNES,
 R. E. RABEAU. (33)